Jan. 7, 1964  F. H. RAYMOND  3,117,266
ELECTRIC MOTOR PROGRAM CONTROL DEVICE
Filed June 3, 1960  2 Sheets-Sheet 1

Inventor:
Francis H. Raymond
By Kenyon, Palmer & Stewart
Attorneys

Jan. 7, 1964 F. H. RAYMOND 3,117,266
ELECTRIC MOTOR PROGRAM CONTROL DEVICE
Filed June 3, 1960 2 Sheets-Sheet 2

Inventor:
Francis H. Raymond
By Kemon, Palmer & Stewart
Attorneys

United States Patent Office 3,117,266
Patented Jan. 7, 1964

3,117,266
ELECTRIC MOTOR PROGRAM CONTROL DEVICE
François Henri Raymond, Saint-Germain-en-Laye, France, assignor to Societe d'Electronique et d'Automatisme, Courbevoie, France
Filed June 3, 1960, Ser. No. 33,846
Claims priority, application France June 5, 1959
8 Claims. (Cl. 318—162)

The present invention concerns improvements in or relating to electric motor control devices and its object is to provide a device which controls the rotation of an electric motor according to a program control of a variable reference defined by the rotation of a pilot motor and more definitely by the angular difference between the instantaneous positions of the shafts of said controlled and pilot motors.

According to a feature of the invention, two mechanical members are mounted to be driven by said shafts, one of said members carrying a plurality of program tracks for defining speed, direction of rotation, and (or) start and stop control and the other of which carries track readers converting the program information into a plurality of electric voltages, and between the voltage supply source of the controlled motor and pilot motor is inserted a routing circuit arrangement for applying said supply voltage to the motor with amplitude and polarity depending on predetermined combinations of the said plurality of electric voltages and consequently on predetermined combinations of the information in said program tracks.

In the accompanying drawings.

Figure 1:
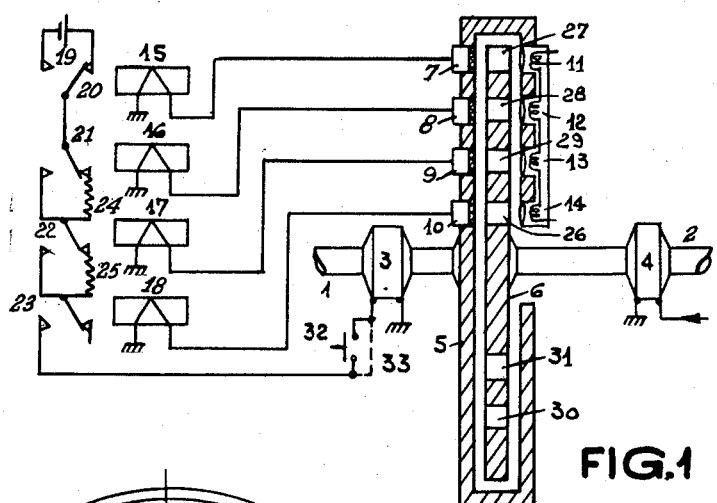
FIG. 1 is a schematic diagram of a first embodiment of the invention.
Figure 2:
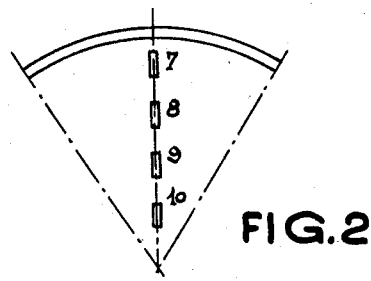
FIG. 2 is a partial plan view of the track reader member in said device.
Figure 3:
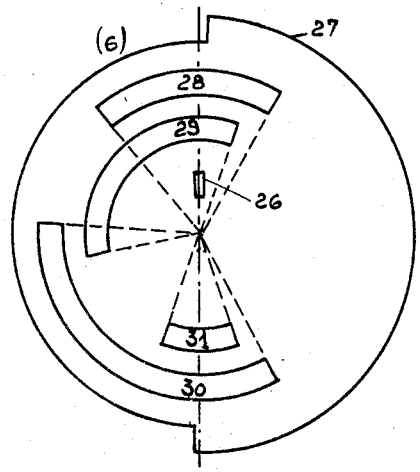
FIG. 3 is a plan view of the track carrying member in said device.

In the embodiments of FIGS. 1 to 3, the controlled motor 3 drives the shaft 1 and the pilot motor 4 is driven by the shaft 2. These shafts have identical axes of rotation. Shaft 1 carries at its end a track reader constituting a cylindrical casing within which may freely rotate a track carrying member 6 shaped as a disk and carried by the end of shaft 2 of the pilot motor.

The program tracks on member 6 are preferably made by locally destroying the opacity of the member, for instance by suitable stamping of said disk-member 6. The track readers may be made of photocells such as 7, 8, 9 and 10 carried by one face of the member 5 whereas its other face, in registration with said photocells, carries light sources such as 11, 12, 13 and 14. Of course the invention is not limited to such kind of tracks and track-readers.

One of the program tracks, FIG. 3, presents only a narrow slit 26 intended to define the stopping of motor 3 when its angular position meets that of the reader 10—14.

Another one of the tracks is made by stamping off one-half of the external periphery of the disk 6 so that an edge 27 is left on the other-half of said periphery. It cooperates with the reader 7—11 for defining the direction of rotation to be imparted to the motor 3.

Two further tracks are shown one made of the arcuate slots 28 and 30, cooperating with the reader 8—12 and the other one comprising the arcuate slots 29 and 31 cooperating with the track-reader 9—13. These tracks are intended to control the speed of motor 3.

The output of photocell 7 is connected to the winding of a relay 15; the output of 8 to the winding of a relay 16; the output of 9 to the winding of a relay 17; and the output of 10 to the winding of a relay 18. These relays have their switch contacts 20, 21, 22 and 23 inserted in a circuit for routing the supply voltage from a battery 19 to the motor 3.

Switch 20 according to its position, applies the supply voltage with one or the other polarity to the routing arrangement, switch 21, when the relay 16 is energized, inserts a resistance 24 in said routing circuit whereas, when unenergized, it completes a direct connection to the next routing stage of the cascade. Switch 22, when energized, inserts a further resistance 25 in the cascade and, when unenergized, completes a direct connection to the next stage of routing, and switch 23, when energized disconnects the routing circuit from the motor 3 whereas, when unenergized, connects said circuit to said motor 3. In the connection between the output of such a routing circuit and the input of the motor there is shown an interrupter contact 32 which is intended to show that, from an external control (not otherwise shown), the motor may be driven only during time intervals of closure of said interrupter 32. Of course, when required, contact 32 may be omitted and a direct connection as shown in dot line at 33, substituted thereto.

Figure 4:
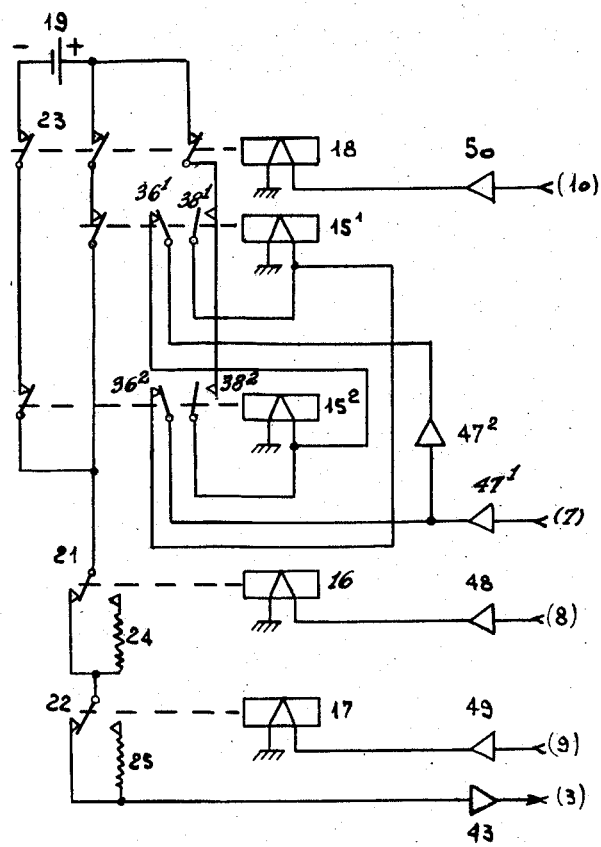
FIG. 4 is a modification of the device of FIG. 1.

As shown in the alternative of FIG. 4, a D.C. amplifier may be inserted between the photocells and the relays and between the routing circuit arrangement and the motor 3.

A further contact might have been provided on the relay 18 and inserted, according to an obvious circuit arrangement, in the supply voltage lead of the pilot motor 4. In such a case, said latter motor is unenergized until the reader 10—14 registers with the slit 26. However such an additional arrangement is not imperative. It is omitted when the motor 3 must follow-up the displacement of motor 4 but is provided when the motor 3 must be energized only when motor 4 is at rest, and contact 32 closed when provided.

The circuit diagram of FIG. 1 is shown for a registration of both members 5 and 6, corresponding to both motors 3 and 4 being unenergized and the slit 26 being angularly coinciding with the reader 10—14.

When a sudden displacement of motor 4 of a slightly lesser amplitude than 180° is imparted, for instance, to the motor shaft 2, in a clockwise direction of movement, the edge 27 obliterates the light flux on the photocell 7 and relay 15 is de-energized, both relays 16 and 17 are energized due to the presence of the slots 30 and 31 and relay 18 is de-energized. Consequently the motor 3 is supplied with a voltage of such a polarity that it rotates in a clockwise direction for pursuing the motor 4 in its angular displacement. The starting period is made at low speed since both resistances 24 and 25 are inserted in the supply path.

Soon after, relay 17 is de-energized and removes resistance 25 from the routing circuit so that the motor 3 is speeded up. Thereafter, slot 30 ends in front of its reader and relay 16 is de-energized, so that no more resistance is inserted in the motor circuit and the motor 3 speeds up at its higher speed value until the slot 28 is brought in front of its reader so that relay 18 is re-energized and the motor is slowed by the resistance 21. Then slot 29 comes in front of its reader and relay 17 is in turn re-energized and the speed of the motor 3 drops up to the position where slit 26 is brought in front of its reader, which re-energized relay 18 and cuts off the motor supply. Motor 3 is stopped.

When the zero position is traversed, relay 18 is de-energized and the motor 3 is again energized. However, since the reader 7—11 is illuminated, the voltage applied to the motor 3 is of reverse polarity with respect to the above described operation. As both resistances are effective in the routing circuit, it is at its lowest speed that motor 3 comes back to the position where slit 26 stops again its movement.

Starting again from the above-defined rest condition and considering a displacement of similar amplitude of the motor 4 but in counterclockwise direction, the motor 3 is supplied with a polarity starting it in the said counterclockwise direction, at a low speed first, both slots 30 and 31 illuminating the readers thereof, then at a higher speed as slot 31 ends, and, after a reduced speed due to the angular overlapping of slots 30 and 29, at a higher speed up to the angular position where slots 29 and 28 overlap until the stopping point defined by 26.

Any other angular displacement of motor 4 will result in a similar operation of the device.

Of course, the number and angular arrangement shown in FIG. 3 is merely illustrative and any other number and angular arrangement of tracks as required may be provided for putting the invention into practice.

Though in FIG. 1 the track-carrying member is secured to the pilot motor 4 and the track-reader member to the controlled motor 3, the reverse is equally operable.

Obviously both motors may be parts of a servo-system so that the application of the invention in such a case would give a program controlled servo-mechanism. In such a case, the track member may be provided with supplementary tracks and the reader member with corresponding readers, the outputs of said readers being used for controlling a routing circuit for controlling the pilot motor 4 or a control member thereof.

In the described example, each photocell output acts on a distinct relay. It would be quite possible, when putting the invention into practice to provide logical combinations of the outputs of said photocells for controlling the condition of a routing circuit responsive to the outputs of the corresponding logical operators. Such operators mean for instance union, intersection, disjunction circuits and the like, otherwise said "OR-circuits," "AND-circuits," "Exclusive-OR circuits," as are well known in computer techniques.

Of course also, electronic relays may be substituted for electromechanical relays of any known structure.

The arrangement of FIG. 1 however, presents a limitation in that for a rotation over 180° of the pilot motor the device looses the memory of the direction of rotation to be imparted to the driven motor 3. When such a limitation must be avoided, recourse may be had to an arrangement such as shown in FIG. 4. FIG. 4 considers the identical arrangement of mechanical members as are shown in FIG. 1.

The reader 7 in this arrangement controls a pair of relays $15^1$ and $15^2$ which are so interconnected that the energization of one of them inhibits the activation of the other one as long as the device is not retturned again to its normal rest condition. One of said relays, $15^1$ for instance, acts the same as the relay 15 of FIG. 1, i.e., it is energized when a higher voltage value issues from 7. Relay $15^2$ however, operates when the voltage value from 7 is a lower one. This condition may be easily obtained by inserting an additional amplifier $47^2$ after the amplifier $47^1$ for the supply of the relay $15^2$ whereas the relay $15^1$ is supplied from the output of $47^1$. All amplifiers 47 to 50 are considered as having a higher voltage output when receiving a higher input.

The winding of relay $15^1$ is reached from the output of amplifier $47^1$ through a rest contact $36^2$ of relay $15^2$. The winding of relay $15^2$ is reached from the output of amplifier $47^2$ through a rest contact $36^1$ of relay $15^1$. With such an arrangement, it is obvious that when one of said relays 15 is energized, the other one cannot be energized since its circuit is cut at the opened rest contact of the other relay.

Further, a rest contact 37 of relay 18 is inserted in a circuit passing through the work contacts $38^1$ and $38^2$ of the relays $15^1$ and $15^2$ and the activation windings of said relays. Consequently, once one of said relays has been energized it is maintained in energized condition until the slit 26 comes into register with the reader 7—11, which illumination of 7 will produce the energization of 18 and the cutting off of said activation circuit for either $15^1$ or $15^2$ as the case may be. This defines the direction of rotation even when the angular displacement of the motor 4 exceeds 180° while preserving at the start of operation, the discrimination between the two possible directions of rotation of the motor 3.

Figure 5:
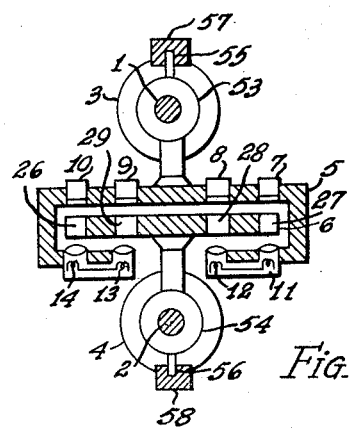
FIG. 5 is a view showing a modified arrangement of the parts shown in FIG. 1.

Instead of providing the members in disc and cylinder forms, rigidly secured to the ends of the shaft, it is possible to make such members rectilinear and have them carried by nuts moving along threaded ends of the shafts, which shafts in such case would be arranged in parallel relationship. Such an arrangement is shown in FIG. 5 wherein motor 3 drives its shaft 1 upon which is mounted a nut 53, the shaft 1 being threaded. A tongue 55 of the nut is guided by a fixed member 57 so that the nut can move along the shaft 1 without rotating around it. Similarly, motor 4 drives its shaft 2 which is threaded and engaged by a nut 54 provided with a tongue 56 guided by a linear member 58 for moving without rotation along the shaft 2. These elements are seen in end views and the shafts are therefore shown in cross section.

The nut 53 carries a member shaped as a box and carrying the cells 7 to 10 inclusive and the lamps 11 to 14 inclusive. The nut 54 carries within the box another member provided with slotted tracks 26 to 29 inclusive. These members are also shown in cross section. The member 5 is relatively short in comparison with the track-carrying member 6 which extends a substantial distance in a direction parallel to the shafts 1 and 2.

It is believed that the operation of this embodiment will be entirely clear in view of the description of the circular arrangement of FIG. 1.

What is claimed is:

1. Apparatus for controlling the rotation of an electric motor in accordance with a programmed control with respect to a variable reference, comprising in combination: a controlled motor; a pilot motor; means for energizing said pilot motor; a pair of mechanical members adjacent each other, one driven by said pilot motor and the other by said controlled motor; a plurality of program tracks carried by one of said mechanical members; a corresponding plurality of track readers carried by the other of said mechanical members, said readers providing an electrical signal whenever aligned with its corresponding program track; a source of voltage for said controlled motor; and circuit means connected between said track readers and said controlled motor for energizing said motor in accordance with the relative position of said program tracks and said track readers.

2. Apparatus as defined by claim 1 including a pair of aligned shafts, one carrying one of said mechanical members and the other carrying the other of said mechanical members and in which said mechanical members are each of disk shaped configuration.

3. Apparatus as defined by claim 1 in which said motors have their shafts positioned in parallel relationship to each other and including a pair of nuts one threadedly engaged with each of said shafts respectively and means mounting said mechanical members on said nuts.

4. Apparatus as defined by claim 1 in which said program tracks comprise light transmitting portions of said one mechanical member, the remainder of said member being opaque and in which said track readers comprise light sources and photo cells arranged on opposite sides of said tracks.

5. Apparatus as defined by claim 1 in which the one of said mechanical members carrying said track reader comprises a pair of spaced supports and the other of said mechanical members is mounted between said supports for movement relative thereto.

6. Apparatus as defined by claim 1 in which said circuit means comprises a cascade of switches, one of said switches comprising a reversing switch and one an on-off switch; a plurality of resistors; and the remaining switches being connected to said resistors and said controlled motor for controlling the speed thereof.

7. Apparatus as defined by claim 6 in which said circuit means further includes a memory store for the direction of rotation of said controlled motor; means for maintaining said store in its initial condition during rotation of said controlled motor; and means for clearing said store upon registry between the angular position of said pilot and controlled motors.

8. Apparatus according to claim 6 in which said circuit means includes means for stopping said pilot motor as soon as said controlled motor is energized.

References Cited in the file of this patent
UNITED STATES PATENTS 2,537,427    Seid et al.  ---------------- Jan. 9, 1951
2,806,986    Luhn  ------------------ Sept. 17, 1957